(12) United States Patent
Yamanishi et al.

(10) Patent No.: US 11,530,467 B2
(45) Date of Patent: Dec. 20, 2022

(54) CEMENTED CARBIDE AND CUTTING TOOL CONTAINING THE SAME AS SUBSTRATE

(71) Applicant: SUMITOMO ELECTRIC HARDMETAL CORP., Itami (JP)

(72) Inventors: Takato Yamanishi, Itami (JP); Shinya Imamura, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 17/425,341

(22) PCT Filed: Dec. 23, 2020

(86) PCT No.: PCT/JP2020/048248
§ 371 (c)(1),
(2) Date: Jul. 23, 2021

(87) PCT Pub. No.: WO2022/137400
PCT Pub. Date: Jun. 30, 2022

(65) Prior Publication Data
US 2022/0195566 A1 Jun. 23, 2022

(51) Int. Cl.
*C22C 29/08* (2006.01)
*B23B 27/14* (2006.01)
(52) U.S. Cl.
CPC ............ *C22C 29/08* (2013.01); *B23B 27/148* (2013.01)
(58) Field of Classification Search
CPC .............................. C22C 29/08; B23B 27/148
See application file for complete search history.

(56) References Cited

U.S. PATENT DOCUMENTS

| 4,334,928 A * | 6/1982 | Hara | B22F 7/06 |
| | | | 75/238 |
| 2003/0026966 A1* | 2/2003 | Kobayashi | C22C 29/08 |
| | | | 428/217 |

(Continued)

FOREIGN PATENT DOCUMENTS

| CN | 109161773 A | 1/2019 |
| CN | 110846547 A | 2/2020 |

(Continued)

OTHER PUBLICATIONS

Written Opinion of the International Searching Authority, from International Application PCT/JP2020/048248 dated Mar. 9, 2021, 6 pages including English Translation.

*Primary Examiner* — Pegah Parvini
*Assistant Examiner* — Ross J Christie
(74) *Attorney, Agent, or Firm* — Xsensus LLP (57) ABSTRACT

Cemented carbide contains a first hard phase and a binder phase. The first hard phase is composed of tungsten carbide particles. The binder phase is composed of cobalt, nickel, iron, and copper as constituent elements. An average content of each of the constituent elements is not lower than 10 atomic % and not higher than 30 atomic %. Cemented carbide contains no second hard phase, or a content of the second hard phase is equal to or lower than 2 mass % of a total amount of cemented carbide. The second hard phase is composed of a compound containing at least one type of a metal element selected from the group consisting of a group-IV element, a group-V element, and a group-VI element in a periodic table except for tungsten and at least one type of an element selected from the group consisting of carbon, nitrogen, and oxygen.

5 Claims, 1 Drawing Sheet

(56) References Cited

U.S. PATENT DOCUMENTS

| | | |
|---|---|---|
| 2009/0074604 A1 | 3/2009 | Chen et al. |
| 2011/0052931 A1* | 3/2011 | Morton ................ B32B 15/043 |
| | | 428/552 |
| 2021/0197288 A1 | 7/2021 | Norgren et al. |

FOREIGN PATENT DOCUMENTS

| | | |
|---|---|---|
| JP | 2009-74173 A | 4/2009 |
| JP | 2019-516007 A | 6/2019 |

* cited by examiner

CEMENTED CARBIDE AND CUTTING TOOL CONTAINING THE SAME AS SUBSTRATE

CROSS-REFERENCE TO RELATED APPLICATION

The present application is based on PCT filing PCT/JP2020/048248, filed Dec. 23, 2020, the entire contents of which are incorporated herein by reference.

TECHNICAL FIELD

The present disclosure relates to cemented carbide and a cutting tool containing the same as a substrate.

BACKGROUND ART

Cemented carbide containing a hard phase mainly composed of tungsten carbide (WC) and a binder phase mainly composed of an iron group element (for example, Fe, Co, and Ni) has conventionally been used as a material for a cutting tool. Characteristics required of the cutting tool include strength (for example, bending strength), toughness (for example, fracture toughness), hardness (for example, Vickers hardness), resistance to plastic deformation, and wear resistance.

A high entropy alloy (HEA) composed of at least four types of metal elements in equal proportions of mole or at a ratio close thereto have been studied. HEAs have been known to exhibit improvement in various mechanical characteristics based on combination of an indefinite number of metal elements. For example, Japanese Patent Laying-Open No. 2009-074173 (PTL 1) discloses an HEA in which C, Si, Al, Cr, Co, Cu, Fe, Ni, V, Mn, Ti, and the like are combined as constituent elements of cemented carbide and Japanese National Patent Publication No. 2019-516007 (PTL 2) discloses an HEA in which Co, Cr, Cu, W, Fe, Ni, Mo, Mn, and the like are combined as constituent elements of cemented carbide.

CITATION LIST

Patent Literature

PTL 1: Japanese Patent Laying-Open No. 2009-074173
PTL 2: Japanese National Patent Publication No. 2019-516007

SUMMARY OF INVENTION

Cemented carbide according to the present disclosure is cemented carbide containing a first hard phase and a binder phase, the first hard phase being composed of tungsten carbide particles, the binder phase being composed of cobalt, nickel, iron, and copper as constituent elements, an average content of each of the constituent elements in the binder phase being not lower than 10 atomic % and not higher than 30 atomic %, cemented carbide containing no second hard phase, or a content of the second hard phase in cemented carbide being equal to or lower than 2 mass % of a total amount of cemented carbide, and the second hard phase being composed of a compound containing at least one type of a metal element selected from the group consisting of a group-IV element in a periodic table, a group-V element in the periodic table, and a group-VI element in the periodic table except for tungsten and at least one type of an element selected from the group consisting of carbon, nitrogen, and oxygen.

A cutting tool according to the present disclosure contains cemented carbide according to the present disclosure as a substrate.

DETAILED DESCRIPTION

Problem to be Solved by the Present Disclosure

Improvement in cutting efficiency in cutting of a difficult-to-machine material represented by an Ni-based alloy such as Inconel® or Hastelloy® has recently been demanded. Mutual diffusion, however, is likely between Ni which is a component contained in the difficult-to-machine material as described above and WC or Co which is a component contained in a conventional material for a superhard tool as disclosed in PTLs 1 and 2. When mutual diffusion occurs, wear resistance of the cutting tool is lowered and lifetime of the cutting tool becomes short. Therefore, lifetime of the cutting tool tends to extremely be shorter in cutting of a difficult-to-machine material than in cutting of an iron-based material (for example, steel).

The present disclosure was made in view of the circumstances, and an object thereof is to provide cemented carbide excellent in wear resistance in machining a difficult-to-machine material, in particular, an alloy containing an Ni-based alloy, and a cutting tool containing the same as a substrate.

Advantageous Effect of the Present Disclosure

According to the present disclosure, cemented carbide excellent in wear resistance and a cutting tool containing the same as a substrate can be provided.

Description of Embodiments of the Present Disclosure

Contents of one embodiment of the present disclosure will initially be listed and described.

[1] Cemented carbide according to one embodiment of the present disclosure is cemented carbide containing a first hard phase and a binder phase, the first hard phase being composed of tungsten carbide particles, the binder phase being composed of cobalt, nickel, iron, and copper as constituent elements, an average content of each of the constituent elements in the binder phase being not lower than 10 atomic % and not higher than 30 atomic %, cemented carbide containing no second hard phase, or a content of the second hard phase in cemented carbide being equal to or lower than 2 mass % of a total amount of cemented carbide, and the second hard phase being composed of a compound containing at least one type of a metal element selected from the group consisting of a group-IV element in a periodic table, a group-V element in the periodic table, and a group-VI element in the periodic table except for tungsten and at least one type of an element selected from the group consisting of carbon, nitrogen, and oxygen.

With the construction as described above, mutual diffusion between Ni contained in the Ni-based alloy and WC or Co contained in the cemented carbide is less likely in cemented carbide. Consequently, cemented carbide is excellent in wear resistance against a work material containing the Ni-based alloy.

[2] In an arbitrary cross-section of cemented carbide, preferably, a total area of an uneven region in the binder phase is not higher than 6% of the entire area of the binder phase, the uneven region being a region where a content of at least one of the constituent elements is not higher than 85% and not lower than 115% of the average content. With such definition, cemented carbide is further higher in wear resistance against the Ni-based alloy.

[3] A cutting tool according to one embodiment of the present disclosure contains cemented carbide described in [1] or [2] as a substrate. The cutting tool contains as the substrate, cemented carbide excellent in wear resistance against the Ni-based alloy. Therefore, even when the cutting tool is used for cutting of a difficult-to-machine material containing the Ni-based alloy, the cutting tool can be longer in lifetime.

[4] The cutting tool preferably further includes a coating provided on the substrate. With the coating on the surface of the substrate, wear resistance of the cutting tool can further be improved. Therefore, the cutting tool can withstand a more severe cutting condition and can be further longer in lifetime.

Details of Embodiments of the Present Disclosure

One embodiment of the present disclosure (which will be denoted as the "present embodiment" below) will be described below. The present embodiment is not limited thereto.

«Cemented Carbide»

Cemented carbide in the present embodiment is cemented carbide containing a first hard phase and a binder phase, the first hard phase being composed of tungsten carbide particles, the binder phase being composed of cobalt, nickel, iron, and copper as constituent elements, an average content of each of the constituent elements in the binder phase being not lower than 10 atomic % and not higher than 30 atomic %, cemented carbide containing no second hard phase, or a content of the second hard phase in cemented carbide being equal to or lower than 2 mass % of a total amount of cemented carbide, and the second hard phase being composed of a compound containing at least one type of a metal element selected from the group consisting of a group-IV element in the periodic table, a group-V element in the periodic table, and a group-VI element in the periodic table except for tungsten and at least one type of an element selected from the group consisting of carbon, nitrogen, and oxygen.

<Composition of Cemented Carbide>

Cemented carbide in the present embodiment is cemented carbide containing a first hard phase and a binder phase and may contain a second hard phase. Cemented carbide may contain an element belonging to none of the first hard phase, the binder phase, and the second hard phase.

<First Hard Phase>

The first hard phase is composed of tungsten carbide (which may be denoted as "WC" below) particles. WC encompasses not only "pure WC (WC containing no impurity element and WC containing an impurity element in an amount smaller than the detection limit)" but also the "first hard phase intentionally or inevitably containing another impurity element so long as effects of the present disclosure are not compromised." A concentration (a total concentration when an impurity is composed of at least two types of elements) of an impurity contained in WC is equal to or lower than 1 mass % of a total amount of WC and the impurity.

(Average Particle Size of WC Particles)

WC particles in cemented carbide have an average particle size preferably not smaller than 0.1 μm and not larger than 10 μm and more preferably not smaller than 0.5 μm and not larger than 3 μm. WC particles in cemented carbide have the average particle size not smaller than 0.1 μm, so that toughness of cemented carbide tends to be high. Therefore, the cutting tool containing cemented carbide as the substrate can achieve suppression of chipping or fracture caused by mechanical shock and thermal shock. Since the cutting tool achieves improved resistance against crack propagation, it can achieve suppression of propagation of the crack and suppression of chipping or fracture. WC particles have the average particle size not larger than 10 μm, so that hardness of cemented carbide tends to be high. Therefore, the cutting tool containing cemented carbide as the substrate can achieve suppressed deformation during cutting and suppression of wear or fracture.

The average particle size of WC particles in cemented carbide is found by mirror-finishing an arbitrary surface or an arbitrary cross-section of cemented carbide, imaging the mirror-finished surface with a microscope, and analyzing the obtained image. Specifically, a size (a Heywood diameter or an equivalent circle diameter) of an individual WC particle in the image is calculated, and an average value thereof is defined as the average particle size of WC particles. The number of WC particles for measurement is set to at least one hundred and preferably to at least two hundred. Preferably, for identical cemented carbide, image analysis is conducted in a plurality of fields of view and an average value thereof is adopted as the average particle size of WC particles. The number of fields of view for image analysis is set preferably to at least five, more preferably to at least seven, further preferably to at least ten, and still further preferably to at least twenty. One field of view may be, for example, in a square shape of 20 μm long×20 μm wide.

Examples of the mirror-finishing method include a method of polishing with a diamond paste, a method using a focused ion beam apparatus (FIB apparatus), a method using a cross-section polisher (CP apparatus), and a method of combination thereof. When the mirror-finished surface is imaged with a metallograph, the machined surface is preferably etched with Murakami's reagent.

Examples of types of microscopes include a metallograph and a scanning transmission electron microscope (SEM). Various types of information such as the average particle size are obtained by importing an image (microscope image) shot with a microscope into a computer and analyzing the image with image analysis software. Each of WC particles in the first hard phase, the binder phase which will be described later, and the second hard phase which will be described later can be identified by a method below.

The first hard phase, the binder phase, and the second hard phase can be identified by using particle size distribution analysis software ("Mac-View" manufactured by MOUN-TECH Co. Ltd.) as image analysis software and binarizing the microscope image. Binarization refers to processing for converting a density of each pixel into two values of 1 and 0 based on a certain reference value (threshold value). Discriminant analysis is employed for binarization in the present disclosure.

(Area Ratio of First Hard Phase)

Cemented carbide according to the present embodiment has an area ratio of the first hard phase preferably not lower than 70% and not higher than 99% and more preferably not lower than 86% and not higher than 95% in an arbitrary surface or an arbitrary cross-section of cemented carbide.

The area ratio of the first hard phase is found, for example, by imaging an arbitrary machined surface of cemented carbide with a microscope and analyzing the image as in finding the average particle size of WC particles described above. Specifically, a binarized image is obtained by binarizing the microscope image for recognizing WC particles with the use of particle size distribution analysis software ("Mac-View" manufactured by MOUNTECH Co. Ltd.). Binarization is performed, for example, based on brightness of a pixel. A threshold value of brightness in binarization is calculated by multiplying a value extracted from any points around the center of a particle in the first hard phase that looks darkest in the image by 0.8. The area ratio of the first hard phase in a field of view can be calculated by calculating the sum of the area (total area) of WC particles in the microscope image based on the binarized image and dividing the sum by an area of the entire field of view (binarized image). Then, for identical cemented carbide, image analysis is conducted in a plurality of fields of view (for example, at least three fields of view) and an average value thereof can be regarded as the area ratio of the first hard phase in the entire surface or cross-section of cemented carbide. A "prescribed field of view" may be the same as the field of view in finding the average particle size of WC particles described above.

<Binder Phase>

The binder phase is a phase that binds together WC particles that form the first hard phase, binds together compound particles that form the second hard phase which will be described later, or binds WC particles that form the first hard phase with compound particles that form the second hard phase. A content of the binder phase is not lower than 4 mass % and not higher than 15 mass %, with cemented carbide being defined as the reference. The binder phase is composed of cobalt (Co), nickel (Ni), iron (Fe), and copper (Cu) as constituent elements.

Cu is adopted as the constituent element of the binder phase in the present disclosure because the Ni-based alloy contains a large amount of chromium (Cr) and when the binder phase contains Cr, wear resistance becomes poor due to mutual diffusion of Cr. In addition, Cu is employed because it is less likely to form a carbide or a nitride in cemented carbide. Therefore, from a point of view of wear resistance against the Ni-based alloy, it is optimal in the present disclosure that the binder phase does not contain Cr but contains Cu.

An average content of each element of Co, Ni, Fe, and Cu with respect to the total amount of Co, Ni, Fe, and Cu in the binder phase is not lower than 10 atomic % (which is denoted as "at %" below) and not higher than 30 at %. Thus, cemented carbide free from precipitation of a different phase and excellent in wear resistance against the Ni-based alloy can be obtained. A content of Co and Ni in the binder phase is preferably not lower than 25 at % and not higher than 30 at % and a content of Fe and Cu in the binder phase is preferably not lower than 20 at % and not higher than 25 at %. Within the range described above, denseness of cemented carbide tends to increase and hardness tends to increase.

An atomic concentration of Co, Ni, Fe, and Cu in the binder phase can be measured with inductively coupled plasma optical emission spectrometry (ICP optical emission spectrometry) (which may be referred to as "ICP spectrometry" below). The present inventors consider the atomic concentration measured with ICP spectrometry as an average atomic concentration in the entire binder phase. When the surface of cemented carbide is covered with a coating of ceramics or diamond-like carbon, the coating is preferably removed by grinding or the like.

(Area Ratio of Binder Phase)

In an arbitrary surface or an arbitrary cross-section of cemented carbide according to the present embodiment, the area ratio of the binder phase is preferably not lower than 1% and not higher than 30% and more preferably not lower than 4% and not higher than 15%. The area ratio of the binder phase is not lower than 1% and not higher than 30%, so that sufficient hardness and denseness in using cemented carbide for the cutting tool can be ensured. The area ratio of the binder phase is not lower than 4% and not higher than 15%, so that hardness and toughness of cemented carbide can further be ensured.

For finding the area ratio of the binder phase, binarization is performed using particle size distribution analysis software ("Mac-View" manufactured by MOUNTECH Co. Ltd.) to obtain a binarized image, as in measurement of the area ratio of the first hard phase. A threshold value of brightness in binarization is calculated by multiplying a value extracted from any points not overlapping with an interface with another phase, of the binder phase that looks brightest in the image by 1.2. The area ratio of the binder phase in a field of view can be calculated by calculating the sum of an area (total area) of the binder phase (Co, Ni, Fe, and Cu particles) in the microscope image based on the binarized image and dividing the sum by the entire area of the field of view (binarized image). Then, for identical cemented carbide, image analysis is conducted in a plurality of fields of view (for example, at least three fields of view) and an average value thereof can be regarded as the area ratio of the binder phase in the entire surface or cross-section of cemented carbide.

(Area Ratio of Uneven Region in Binder Phase)

In one aspect of the present embodiment, in an arbitrary cross-section of cemented carbide, with a region where a content of at least one of the constituent elements is not higher than 85% and not lower than 115% of the average content being defined as an uneven region, the total area of the uneven region in the binder phase is preferably not higher than 6% and more preferably not higher than 3% of the entire area of the binder phase, which means less unevenness of composition in the binder phase in the entire cemented carbide. When the ratio exceeds 6%, wear resistance against the Ni-based alloy tends to become poor.

(Imaging)

The ratio above can be calculated with a method below. Specifically, any number of (for example, at least ten) electronic images are obtained by picking up an image of an arbitrary cross-section obtained with a focused ion beam apparatus (FIB apparatus) or a cross-section polisher (CP apparatus) at a 5000-fold magnification with the use of a scanning transmission electron microscope (SEM).

(Binarization)

A binarized image is obtained by binarizing the electronic images with the use, for example, of particle size distribution analysis software ("Mac-View" manufactured by MOUNTECH Co. Ltd.). A threshold value of brightness in binarization is calculated by multiplying a value extracted from any points not overlapping with an interface with another phase, of the binder phase that looks brightest in the image by 1.2. The binder phase is detected based on the binarized image.

(Calculation of Concentration)

Element mapping is performed on a prescribed region (for example, 12 μm×9 μm) of the detected binder phase by using an electron probe micro analyzer (EPMA) annexed to the SEM or energy dispersive X-ray spectroscopy (EDS). In element mapping, the phase containing WC is regarded as the first hard phase, and the phase containing Co, Ni, Fe, and Cu is regarded as the binder phase. The first hard phase and the binder phase have a clear interface and difference in brightness therebetween in the image picked up by the SEM, and a brighter phase can be regarded as the first hard phase and a darker phase can be regarded as the binder phase.

When a content of any element of Co, Ni, Fe, and Cu is detected as being higher or lower than in another region of the binder phase in element mapping, point analysis is conducted around an area center of the binder phase to calculate a content of each element with a total measurement value of Co, Ni, Fe, and Cu being defined as 100. When the content is compared with the content of each element calculated in ICP optical emission spectrometry described above and when the difference between the contents is not higher than 85% and not lower than 115%, the area of the binder phase can be calculated with particle size distribution analysis software ("Mac-View" manufactured by MOUN-TECH Co. Ltd.) to calculate the area ratio thereof in the entire cemented carbide. Then, for the identical binder phase, image analysis is conducted in a plurality of fields of view (for example, at least three fields of view) and an average value thereof can be regarded as the area ratio of the binder phase.

<Second Hard Phase>

Cemented carbide according to the present embodiment contains no second hard phase, or a content of the second hard phase with respect to the total amount of cemented carbide is not higher than 2 mass %. Preferably, cemented carbide contains no second hard phase. When cemented carbide contains the second hard phase, it is estimated that the second hard phase has been added to such an extent as not interfering the effects of the present invention and that the second hard phase has inevitably been produced during the course of manufacturing rather than being added as a source material.

The second hard phase is composed of a compound (a composite compound) containing "at least one type of a metal element selected from the group consisting of a group-IV elements in the periodic table, a group-V element in the periodic table, and a group-VI element in the periodic table except for tungsten" and "at least one type of an element selected from the group consisting of carbon (C), nitrogen (N), and oxygen (O)." Examples of the group-IV elements in the periodic table include titanium (Ti), zirconium (Zr), and hafnium (Hf). Examples of the group-V elements in the periodic table include vanadium (V), niobium (Nb), and tantalum (Ta). Examples of the group-VI element in the periodic table include chromium (Cr) and molybdenum (Mo). The compound mainly refers to a carbide, a nitride, a carbonitride, and an oxide of the metal elements described above.

The second hard phase is a compound phase or a solid solution phase composed of at least one type of the compound. The "compound phase or the solid solution phase" means that a compound that forms such a phase may form a solid solution or may be present as an individual compound without forming a solid solution.

Specific examples of the second hard phase include such compounds as TaC, NbC, TiC, TiCN, $Cr_3C_2$, $Cr_7C_3$, $Al_2O_3$, and $SiO_2$.

(Mass Ratio of Second Hard Phase)

When cemented carbide contains the second hard phase, a content of the second hard phase is not higher than 2 mass % of cemented carbide. When the content of the second hard phase exceeds 2 mass %, a behavior in solid solution and reprecipitation in a sintering step tends to vary, which may interfere with composition of cemented carbide. Even though Cr is in a state of a solid solution in the binder phase, Cr is less likely to form a solid solution in a phase containing Cu and the composition of the binder phase also tends to be uneven. Furthermore, wear resistance tends to become poor due to mutual diffusion of Cr contained in large amount in the Ni-based alloy.

(Area Ratio of Second Hard Phase)

In an arbitrary surface or an arbitrary cross-section of cemented carbide, the area ratio of the second hard phase is preferably not higher than 1.5%.

For finding the area ratio of the second hard phase, binarization is performed using particle size distribution analysis software ("Mac-View" manufactured by MOUN-TECH Co. Ltd.) to obtain a binarized image, as in measurement of the area ratio of the first hard phase. A threshold value of brightness in binarization is calculated by multiplying a value extracted from a particulate phase which is not of interest of detection in binarization of the first hard phase by 0.8. The area ratio of the second hard phase in a field of view can be calculated by calculating the sum of the area (total area) of the second hard phase in the microscope image based on the binarized image and dividing the sum by an area of the entire field of view (binarized image). Then, for identical cemented carbide, image analysis is conducted in a plurality of fields of view (for example, at least three fields of view) and an average value thereof can be regarded as the area ratio of the second hard phase in the entire surface or cross-section of cemented carbide. It is obvious for a person skilled in the art to find in measurement, an area ratio in the cross-section at a prescribed position from the surface of cemented carbide. The prescribed position is preferably, for example, a portion corresponding to 50% of a thickness of a measurement sample, specifically, a portion distant by 500 μm from the surface. Since the area ratio of the second hard phase may vary at a surface portion of cemented carbide, it is also obvious for a person skilled in the art to conduct measurement at a portion other than the surface.

«Method of Manufacturing Cemented Carbide»

Cemented carbide in the present embodiment can representatively be manufactured through steps of preparing, mixing, forming, and sintering source material powders in this order. Each step will be described below.

<Preparation Step>

The preparation step is a step of preparing source material powders of all materials that will form cemented carbide. Examples of the source material powders of the first hard phase include WC particles. Examples of a source material for the binder phase include (i) particles in which Co, Ni, Fe, and Cu are alloyed in accordance with prescribed formulation (which may be referred to as "CoNiFeCu alloy particles" below), (ii) particles in which Co particles and Ni, Fe, and Cu are alloyed in accordance with prescribed formulation (which may be referred to as "NiFeCu alloy particles" below), or (iii) each of Co particles, Ni particles, Fe particles, and Cu particles used alone.

As described above, for source material powders of Co, Ni, Fe, and Cu which are constituent elements of the binder phase, (i) CoNiFeCu alloy particles, (ii) Co particles and NiFeCu alloy particles, or (iii) each of Co particles, Ni particles, Fe particles, and Cu particles alone can be used, and among these, (i) CoNiFeCu alloy particles are preferably used. In adding each of Co, Ni, Fe, and Cu alone as source material powders or in adding each of Ni, Fe, and Cu alone as source material powders, when a sintering temperature is low, diffusion in a liquid phase is insufficient, a difference in concentration is produced in the binder phase, and a dense alloy cannot be obtained. Since Co in the liquid phase is excellent in wettability to WC particles, Co alone may be employed as the source material.

(WC Particles)

WC particles as the source material are not particularly restricted, and WC particles generally used for manufacturing cemented carbide should only be used. Commercially available WC particles may be used. Examples of commercially available WC particles include "uniform tungsten carbide powder" series manufactured by A.L.M.T. Corp.

WC particles as the source material have the average particle size preferably not smaller than 0.1 μm and not larger than 10 μm and more preferably not smaller than 0.5 μm and not larger than 3 μm. WC particles as the source material have the average particle size not smaller than 0.1 μm, so that toughness tends to be high when they form cemented carbide. Therefore, a cutting tool containing cemented carbide as the substrate can achieve suppression of chipping and fracture caused by mechanical shock and thermal shock. Since the cutting tool achieves improved resistance against crack propagation, it can achieve suppression of propagation of the crack and suppression of chipping and fracture. WC particles have the average particle size not larger than 10 μm, so that hardness of cemented carbide formed thereof tends to be high. Therefore, the cutting tool containing cemented carbide as the substrate can achieve suppressed deformation during cutting and suppression of wear and fracture.

(CoNiFeCu Alloy Particles)

Particles (CoNiFeCu alloy particles) in which Co, Ni, Fe, and Cu are alloyed in accordance with prescribed formulation are manufactured from particles below. Examples of a method of manufacturing CoNiFeCu alloy particles include a mechanical method, a chemical method, and atomization, and atomization is preferably used. In atomization, a metal to be alloyed is molten, and by scattering and solidifying the molten metal (melt), powders of the metal are made. The alloy can be obtained by preparing the powders to have an aimed particle size and uniformly mixing the powders.

Co particles as the source material are not particularly restricted, and Co particles generally used for manufacturing cemented carbide should only be used. Examples of Co particles include particles of Co alone. Commercially available Co particles may be used.

Ni particles as the source material are not particularly restricted, and Ni particles generally used for manufacturing cemented carbide should only be used. Examples of Ni particles include particles of Ni alone. Commercially available Ni particles may be used.

Fe particles as the source material are not particularly restricted, and Fe particles generally used for manufacturing cemented carbide should only be used. Examples of Fe particles include particles of Fe alone. Commercially available Fe particles may be used.

Cu particles as the source material are not particularly restricted, and Cu particles generally used for manufacturing cemented carbide should only be used. Examples of Cu particles include particles of Cu alone. Commercially available Cu particles may be used.

A concentration (a total concentration when an impurity is composed of at least two types of elements) of an impurity in Co particles, Ni particles, Fe particles, and Cu particles is equal to or lower than 2 mass % of the total amount of those particles and the impurity.

CoNiFeCu alloy particles obtained by the manufacturing method above have an FSSS particle size (an average particle size measured by a Fisher sub-sieve sizer) is preferably not smaller than 0.5 μm and not larger than 50 μm. The Fisher sub-sieve sizer refers to a method of finding a particle size of particles by measuring a specific surface area of particles by using flow resistance of air. The FSSS particle size can be measured, for example, with the use of Fisher Sub-Sieve Sizer Model 95 (manufactured by Fisher Scientific).

(NiFeCu Alloy Particles)

Particles (NiFeCu alloy particles) in which Ni, Fe, and Cu are alloyed in accordance with prescribed formulation are manufactured from particles described above. Examples of a method of manufacturing NiFeCu alloy particles include the mechanical method, the chemical method, and atomization described above, and atomization is preferably used.

NiFeCu alloy particles obtained by the manufacturing method above have the FSSS particle size preferably not smaller than 0.5 μm and not larger than 50 μm. Co particles, Ni particles, Fe particles, and Cu particles have the FSSS particle size preferably not smaller than 0.5 μm and not larger than 50 μm.

<Mixing Step>

The mixing step is a step of mixing source material powders prepared in the preparation step. Mixed powders in which source material powders are mixed are obtained in the mixing step. A mass ratio of source material powders (for example, WC particles, CoNiFeCu alloy particles, and NiFeCu alloy particles) in mixing corresponds to the area ratio of the first hard phase and the area ratio of the binder phase described above. A known apparatus can be employed as an apparatus to be used in the mixing step. For example, an attritor, a tumbling ball mill, a Kalman mixer, and a bead mill can be employed.

A time period for mixing by an attritor is not particularly restricted, and for example, the time period not shorter than 0.1 hour and not longer than forty-eight hours can be set. From a point of view of uniform mixing of source material powders, the time period for mixing described above is preferably not shorter than two hours and not longer than fifteen hours. A condition for mixing by the attritor may be set to either wet mixing or dry mixing. Mixing may be performed in a solvent such as water, ethanol, acetone, or isopropyl alcohol. Mixing with such a binder as polyethylene glycol or paraffin wax may be performed.

After the mixing step, mixed powders may be granulated as necessary. By granulating mixed powders, a die or a mold is readily filled with mixed powders in a forming step which will be described later. A known granulation method can be applied to granulation, and for example, a commercially available granulation machine such as a spray drier can be employed.

<Forming Step>

The forming step is a step of obtaining a molded body by forming mixed powders obtained in the mixing step into a prescribed shape. A general method and a general condition should only be adopted as a method and a condition for forming in the forming step, without particularly being restricted. For example, a molded body may be obtained by placing mixed powders in a Ta capsule and applying a pressure thereto by pressing. A pressure in pressing may be not lower than 10 MPa and not higher than 16 GPa. Examples of a prescribed shape include a shape of the cutting tool (for example, a shape of an indexable insert).

<Sintering Step>

The sintering step is a step of obtaining a sintered material by sintering the molded body obtained in the forming step. In the sintering step, the molded body is preferably sintered with a sufficient time period being spent after appearance of the liquid phase of the binder phase. Specifically, a sintering temperature is preferably not lower than 1400° C. and not higher than 1600° C. A time period for sintering is preferably not shorter than 0.5 hour and not longer than two hours.

An atmosphere for sintering is not particularly limited, and examples of the atmosphere include an $N_2$ gas atmosphere, an atmosphere of inert gas such as Ar, or a hydrogen gas atmosphere. Vacuum (pressure) in sintering is preferably not lower than 0.1 kPa and not higher than 10 kPa.

In the sintering step, a sinter HIP in which a pressure can be applied during sintering may be performed. Conditions for the HIP include, for example, a temperature not lower than 1300° C. and not higher than 1350° C. and a pressure not lower than 5 MPa and not higher than 200 MPa in the $N_2$ gas atmosphere or the atmosphere of inert gas such as Ar.

A rate of temperature decrease from the highest temperature to room temperature is preferably from 2° C./minute to 50° C./minute. The "rate of temperature decrease being 2° C./minute" means lowering in temperature at a rate of 2° C. per minute. An atmosphere during cooling is not particularly limited, and the $N_2$ gas atmosphere or the atmosphere of inert gas such as Ar may be set. A pressure during cooling is not particularly limited, and a pressure may be increased or reduced. The pressure in pressure increase is, for example, not lower than 400 kPa and not higher than 500 kPa. The pressure in pressure reduction is, for example, not higher than 100 kPa, and preferably not lower than 10 kPa and not higher than 50 kPa.

«Cutting Tool»

Since cemented carbide in the present embodiment is excellent in wear resistance as described previously, it can be used for the cutting tool and the substrate. The cutting tool in the present embodiment contains cemented carbide as the substrate. Cemented carbide in the present embodiment can also be used for a wear resistant tool and a grinding tool, and the wear resistant tool and the grinding tool contain cemented carbide as the substrate.

Cemented carbide in the present embodiment can widely be applied to a conventionally known cutting tool, and examples of the cutting tool include a cutting tool, a drill, an end mill, a throwaway tip for milling, a throwaway tip for turning, a metal saw, a gear cutting tool, a reamer, or a tap. Cemented carbide in the present embodiment can also widely be applied to conventionally known wear resistant tool and grinding tool. Examples of the wear resistant tool include a die, a scriber, a scribing wheel, or a dresser, and examples of the grinding tool include a grindstone.

The entirety of these tools may be composed of cemented carbide in the present embodiment. A part of these tools may be composed of cemented carbide. The "part being composed of" cemented carbide means, for example, that, in the case of the cutting tool, cemented carbide in the present embodiment is brazed to a prescribed position of an arbitrary substrate to form a cutting edge.

<Coating>

The cutting tool according to the present embodiment may further include a coating provided on the substrate. The wear resistant tool and the grinding tool according to the present embodiment may further include the coating provided on the substrate. The coating is exemplarily composed of a compound of at least one type of an element selected from the group consisting of a group-IV metal element in the periodic table, a group-V metal element in the periodic table, a group-VI metal element in the periodic table, aluminum (Al), and silicon (Si) and at least one type of an element selected from the group consisting of nitrogen (N), oxygen (O), carbon (C), and boron (B). Examples of the compound include TiCN, $Al_2O_3$, TiAlN, TiN, TiC, and AlCrN. In the present embodiment, the coating may be composed of a metal alone. In addition, cubic boron nitride (cBN) and diamond-like carbon are also suitable for a composition of the coating. Such a coating can be formed by a vapor phase method such as chemical vapor deposition (CVD) and physical vapor deposition (PVD). When the coating is formed by CVD, a coating excellent in intimate contact with the substrate tends to be obtained. Examples of CVD include thermal CVD. When the coating is formed by PVD, compressive residual stress is provided and toughness of the cutting tool or the like tends to be enhanced.

The coating in the cutting tool according to the present embodiment is preferably provided at a portion to be a cutting edge in the substrate and in the vicinity thereof. The coating may be provided on the entire surface of the substrate. The coating may be formed from a single layer or a plurality of layers. The coating may have a thickness not smaller than 1 μm and not larger than 20 μm or not smaller than 1.5 μm and not larger than 15 μm.

Example

Though the present invention will be described in detail below with reference to Example, the present invention is not limited thereto.

«Making of Cemented Carbide»

<Preparation Step>

(Making of CoNiFeCu Alloy Powders)

Powders of a CoNiFeCu alloy (which may be referred to as "CoNiFeCu alloy powders" below) which were a source material for the binder phase were made with a method below. CoNiFeCu alloy powders correspond to "CoNiFeCu alloy particles" described above. Initially, source material powders were blended in accordance with formulation shown in Table 1, and the CoNiFeCu alloy was made by atomization.

TABLE 1

| Sample No. | Mixing Step Formulation of Source Material Powders (wt %) | | | Sintering Step | | Composition of Binder Phase (at %) | | | | Average Particle Size of First Hard Phase (μm) | Area Ratio of Second Hard Phase (%) | Area Ratio of Uneven Region in Binder Phase (%) | Average Thickness of Diffusion Phase (μm) | Cutting Time Period (min) |
|---|---|---|---|---|---|---|---|---|---|---|---|---|---|---|
| | WC | TaC | Binder Phase | Sintering Temperature (° C.) | Sintering Time Period (hr) | Co | Ni | Fe | Cu | | | | | |
| 1 | 94.0 | 0.0 | 6.0 | 1450 | 0.5 | 25.0 | 25.0 | 25.0 | 25.0 | 1.1 | 0.0 | 4.1 | 16.9 | 28 |
| 2 | 94.0 | 0.0 | 6.0 | 1450 | 0.5 | 30.0 | 30.0 | 20.0 | 20.0 | 1.2 | 0.0 | 3.3 | 18.1 | 28 |

TABLE 1-continued

| Sample No. | Mixing Step Formulation of Source Material Powders (wt %) | | | Sintering Step | | Composition of Binder Phase (at %) | | | | Average Particle Size of First Hard Phase (μm) | Area Ratio of Second Hard Phase (%) | Area Ratio of Uneven Region in Binder Phase (%) | Average Thickness of Diffusion Phase (μm) | Cutting Time Period (min) |
|---|---|---|---|---|---|---|---|---|---|---|---|---|---|---|
| | WC | TaC | Binder Phase | Sintering Temperature (°C.) | Sintering Time Period (hr) | Co | Ni | Fe | Cu | | | | | |
| 3 | 94.0 | 0.0 | 6.0 | 1450 | 0.5 | 30.0 | 30.0 | 30.0 | 10.0 | 1.1 | 0.0 | 3.6 | 18.3 | 25 |
| 4 | 94.0 | 0.0 | 6.0 | 1450 | 0.5 | 20.0 | 20.0 | 30.0 | 30.0 | 1.2 | 0.0 | 4.4 | 21.9 | 25 |
| 5 | 94.0 | 0.0 | 6.0 | 1450 | 0.5 | 10.0 | 30.0 | 30.0 | 30.0 | 1.2 | 0.0 | 11.2 | 22.9 | 19 |
| 6 | 88.0 | 0.0 | 12.0 | 1450 | 0.5 | 25.0 | 25.0 | 25.0 | 25.0 | 1.2 | 0.0 | 3.9 | 19.2 | 22 |
| 7 | 97.0 | 0.0 | 3.0 | 1450 | 0.5 | 25.0 | 25.0 | 25.0 | 25.0 | 1.1 | 0.0 | 4.1 | 20.3 | 19 |
| 8 | 82.0 | 0.0 | 18.0 | 1450 | 0.5 | 25.0 | 25.0 | 25.0 | 25.0 | 1.1 | 0.0 | 4.9 | 20.9 | 19 |
| 9 | 94.0 | 0.0 | 6.0 | 1450 | 0.5 | 25.0 | 25.0 | 25.0 | 25.0 | 0.4 | 0.0 | 4.6 | 21.2 | 19 |
| 10 | 94.0 | 0.0 | 6.0 | 1450 | 0.5 | 25.0 | 25.0 | 25.0 | 25.0 | 3.5 | 0.0 | 3.9 | 22.8 | 19 |
| 11 | 94.0 | 0.0 | 6.0 | 1450 | 0.5 | 25.0 | 25.0 | 25.0 | 25.0 | 1.2 | 0.0 | 1.5 | 14.9 | 34 |
| 12 | 94.0 | 0.0 | 6.0 | 1450 | 0.5 | 30.0 | 30.0 | 20.0 | 20.0 | 1.3 | 0.0 | 1.1 | 14.6 | 31 |
| 13 | 94.0 | 0.0 | 6.0 | 1450 | 0.5 | 30.0 | 30.0 | 30.0 | 10.0 | 1.5 | 0.0 | 0.9 | 13.5 | 31 |
| 14 | 94.0 | 0.0 | 6.0 | 1450 | 0.5 | 20.0 | 20.0 | 30.0 | 30.0 | 1.3 | 0.0 | 2.8 | 15.7 | 31 |
| 15 | 92.0 | 2.0 | 6.0 | 1450 | 0.5 | 25.0 | 25.0 | 25.0 | 25.0 | 1.1 | 2.0 | 5.6 | 21.9 | 19 |
| 101 | 94.0 | 0.0 | 6.0 | 1450 | 0.5 | 100.0 | 0.0 | 0.0 | 0.0 | 1.3 | 0.0 | — | 34.6 | 7 |
| 102 | 90.0 | 4.0 | 10.0 | 1450 | 0.5 | 25.0 | 25.0 | 25.0 | 25.0 | 1.2 | 4.2 | 4.5 | 29.8 | 10 |
| 103 | 94.0 | 0.0 | 6.0 | 1450 | 0.5 | 50.0 | 35.0 | 10.0 | 5.0 | 1.1 | 0.0 | 5.3 | 31.8 | 10 |
| 104 | 94.0 | 0.0 | 6.0 | 1450 | 0.5 | 10.0 | 10.0 | 40.0 | 40.0 | 1.1 | 0.0 | 18.5 | 34.1 | 7 |
| 105 | 88.0 | 0.0 | 12.0 | 1450 | 0.5 | 100.0 | 0.0 | 0.0 | 0.0 | 1.4 | 0.0 | — | 31.6 | 4 |
| 106 | 94.0 | 0.0 | 6.0 | 1450 | 0.5 | — | — | — | — | 1.3 | 2.5 | 25.6 | 28.8 | 10 |
| 107 | 94.0 | 0.0 | 6.0 | 1450 | 0.5 | — | — | — | — | 1.3 | 0.0 | 28.9 | 28.4 | 10 |

Then, the obtained CoNiFeCu alloy was crushed by a bead mill under conditions below. Slurry containing the CoNiFeCu alloy obtained by crushing was dried in vacuum. The CoNiFeCu alloy powders having the FSSS particle size of 1.5 μm were obtained in a procedure above.

[Condition for Crushing by Bead Mill]

Bead: particle size of 1.0 mm

Dispersion medium: ethanol or acetone

Treatment time period: eight hours (Preparation of Other Source Material Powders)

Powders composed as shown in Table 1 were prepared as source material powders. Other than WC, TaC, and CoNi-FeCu alloy powders in Table 1, powders below were used as source material powders for the binder phase. For a sample No. 106, HEA powders (corresponding to Example 1 in PTL 1) obtained by blending Al, Cr, Cu, Fe, Mn, Ti, and V as the binder phase at a mole ratio of 1:1:1:1:1:1:1 were employed, and for a sample No. 107, HEA powders (corresponding to Example 2 in PTL 2) obtained by blending Co, Cr, Cu, Fe, and Ni as the binder phase at an atomic ratio of 1:1:1:1:1 were employed. Commercially available particles were employed for each element in samples Nos. 106 and 107.

WC: FSSS particle size: 2.0 μm (0.7 μm in sample No. 9, 5.0 μm in sample No. 10)

Co: FSSS particle size: 1.1 μm

Ni: FSSS particle size: 3.3 μm

Fe: FSSS particle size: 3.0 μm

Cu: FSSS particle size: 2.8 μm

TaC: FSSS particle size: 1.8 μm

<Mixing Step>

Mixed powders were made by adding prepared source material powders in accordance with formulation shown in Table 1 and mixing the source material powders with the use of the attritor. Conditions for mixing are shown below. Mixed powders were obtained by drying in the atmosphere, slurry obtained after mixing.

[Condition for Mixing by Attritor]

Ball: made of cemented carbide and having diameter of 3.5 mm

Dispersion medium: ethanol

Rotation speed of agitator: 100 rpm

Treatment time period: twelve hours

<Forming Step>

Obtained mixed powders were press-formed to make a molded body in a shape of a model SNG432 (manufactured by Sumitomo Electric Hardmetal Corp.) (indexable insert).

<Sintering Step>

The obtained molded body was introduced into a sintering furnace and sintered at the sintering temperature and the sintering time period shown in Table 1 in the Ar gas atmosphere (0.5 kPa).

After sintering was completed, the sintered material was cooled to room temperature in the Ar gas atmosphere. The sintered material was cooled at a rate of temperature decrease at 20° C./minute from the sintering temperature shown in Table 1 to the room temperature. As set forth above, cemented carbide of samples Nos. 1 to 15 and cemented carbide of samples Nos. 101 to 107 were made. Cemented carbide of samples Nos. 1 to 15 correspond to Example. Cemented carbide of samples Nos. 101 to 107 correspond to Comparative Example.

In Comparative Example, samples Nos. 101 and 105 were composed of cemented carbide in which the binder phase was composed of Co alone. Sample No. 102 was composed of cemented carbide in which TaC as the second hard phase was added to source material powders. Samples Nos. 103 and 104 were composed of cemented carbide in which the binder phase was composed of Co, Ni, Fe, and Cu whereas the atomic concentration of each element did not meet the requirement in the present disclosure. Sample No. 106 corresponds to Example 1 in PTL 1, and it was composed of cemented carbide containing an HEA, in which the binder phase was composed of Al, Cr, Cu, Fe, Mn, Ti, and V. Sample No. 107 corresponds to Example 2 in PTL 2, and it was composed of cemented carbide containing an HEA in which the binder phase was composed of Co, Cr, Cu, Fe, and Ni.

«Observation of Sample»

<Calculation of Average Particle Size of Tungsten Carbide Particles>

A cut plane obtained by cutting cemented carbide of manufactured samples Nos. 1 to 15 and samples Nos. 101 to 107 at a plane distant from an edge by at least 0.1 mm was mirror-finished. Thereafter, the mirror-finished cut plane was subjected to ion milling by argon ion beams, and the cross-section was adopted as a microscope observation sample.

The mirror-finished surface of the observation sample was imaged at a 2000-fold magnification with the use of a scanning transmission electron microscope (manufactured by JEOL Ltd.). The outside of the mirror-finished surface and the center of the mirror-finished surface of each sample was each imaged in ten fields of view.

The particle size (Heywood diameter) of an individual particle of at least three hundred tungsten carbide particles of each sample per one field of view was found with the use of particle size distribution analysis software ("Mac-View" manufactured by MOUNTECH Co. Ltd.), and the average particle size of sintered tungsten carbide particles in ten fields of view in total was calculated. Consequently, it was found that the average particle size of sintered tungsten carbide particles was substantially equal to the average particle size of WC particles adopted as the source material. Table 1 shows results in the field of "Average Particle Size of First Hard Phase." In measuring the particle size, particles containing W and C were identified as tungsten carbide particles by element mapping using an energy dispersive X-ray spectroscope (EDS) annexed to the SEM.

<Calculation of Area Ratio of First Hard Phase, Binder Phase, and Second Hard Phase>

A binarized image was obtained by binarization under conditions below with the use of particle size distribution analysis software ("Mac-View" manufactured by MOUNTECH Co. Ltd.). The area ratio of the first hard phase, the binder phase, and the second hard phase in the mirror-finished surface of each sample was found based on the binarized image. Table 1 shows the calculated area ratio of the second hard phase. The mirror-finished surface was set at a position distant by 500 µm from the surface.

[Condition for Binarization]

Threshold value of brightness of first hard phase: 115
Threshold value of brightness of binder phase: 62
Threshold value of brightness of second hard phase: 88

<Analysis of Composition of Binder Phase>

The composition of the binder phase was found by analyzing the binder phase at the machined surface of each sample with inductively coupled plasma optical emission spectrometry (ICP optical emission spectrometry). Consequently, it was found that the composition of the binder phase corresponded to the formulation (Table 1) of source material powders.

<Area Ratio of Each Element of Co, Ni, Fe, and Cu in Binder Phase>

An image of a cross-section obtained with a cross-section polisher (CP apparatus) was initially picked up at a 5000-fold magnification by using an SEM to obtain ten electronic images. Binarized images were obtained by binarizing the electronic images with the use of particle size distribution analysis software ("Mac-View" manufactured by MOUNTECH Co. Ltd.) under conditions as in "<Calculation of Area Ratio of First Hard Phase, Binder Phase, and Second Hard Phase>" described above. The binder phase was detected based on the binarized images. The detected binder phase in a plurality of regions each having a size of 12 µm×9 µm was subjected to element mapping by energy dispersive X-ray spectroscopy (EDS) annexed to the SEM. When a content of any element of Co, Ni, Fe, and Cu was detected as being higher or lower than in another region of the binder phase in element mapping, point analysis was conducted around the area center of the binder phase to calculate a content of each element with a total measurement value of Co, Ni, Fe, and Cu being defined as 100. When the content was compared with the content of each element calculated in ICP optical emission spectrometry described above and when the difference between the contents was not higher than 85% and not lower than 115%, the area of the binder phase was measured with particle size distribution analysis software ("Mac-View" manufactured by MOUNTECH Co. Ltd.) to calculate the area ratio thereof in the entire cemented carbide. Table 1 shows results in the field of "Area Ratio of Uneven Region in Binder Phase."

«Evaluation Test»

<Test of Reactivity Resistance>

Figure 1:
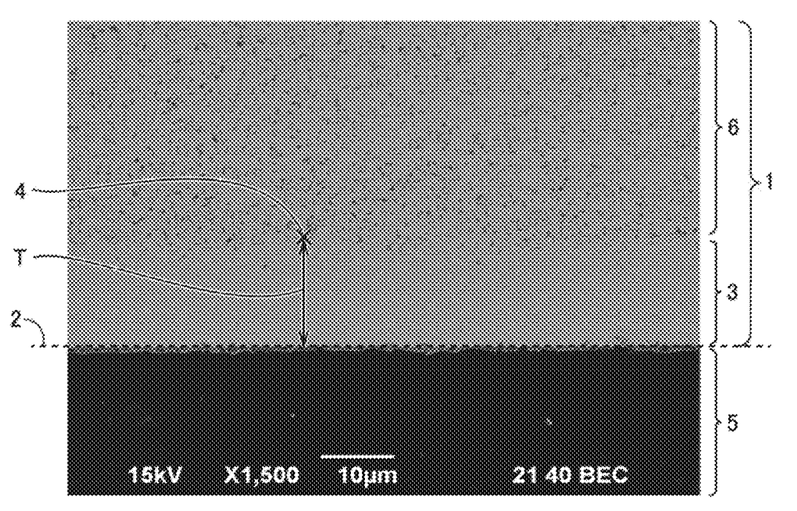
FIG. 1 is a schematic cross-sectional view for illustrating evaluation of reactivity resistance of cemented carbide according to the present embodiment.

A test of reactivity resistance of cemented carbide in the present embodiment will be described below with reference to FIG. 1. Cemented carbide 1 of samples Nos. 1 to 15 and samples Nos. 101 to 107 made as described above and Inconel® 718 (a work material 5) were cut and machined with a method as in "<Area Ratio of Each Element of Co, Ni, Fe, and Cu in Binder Phase>" described above. A cross-section of each machined sample and a cross-section of work material 5 were superimposed on each other, and the sample and the work material were heated for one hour in vacuum at 900° C. while they were held at a constant pressure not lower than 10 kPa. A heated joined product of cemented carbide 1 and work material 5 was cut and machined with the method as in "<Area Ratio of Each Element of Co, Ni, Fe, and Cu in Binder Phase>" described above and a cross-section perpendicular to a surface where the joined product was joined was adopted as the microscope observation sample.

The machined surface of the observation sample made as described above was imaged at a 1500-fold magnification with the use of a scanning transmission electron microscope (SEM) (manufactured by JEOL Ltd.). FIG. 1 shows an exemplary SEM image imaged as such. In the SEM image in FIG. 1, a layer (diffusion phase 3) in cemented carbide 1 high in contrast in the SEM image within a certain range extending from a surface 2 of contact between cemented carbide 1 and work material 5 to the inside of cemented carbide 1 as a result of progress of diffusion of an element owing to heating treatment was observed. At an interface 6 between diffusion phase 3 and a normal cemented carbide structure within a field of view of the SEM image, a length of a line drawn perpendicularly from a point 4 farthest from work material 5 toward surface 2 of contact was defined as a thickness T of the diffusion phase, and an average value of thickness T of the diffusion phase in at least three fields of view where surface 2 of contact with work material 5 was present was measured. Table 1 shows results in the field of "Average Thickness of Diffusion Phase." As the average value of thickness T of the diffusion phase is smaller, cemented carbide 1 can be evaluated as being excellent in reactivity resistance to the Ni-based alloy.

When cemented carbide (Example) of samples Nos. 1 to 15 was compared with cemented carbide (Comparative Example) of samples Nos. 101 to 107, Example tended to be higher in reactivity resistance than Comparative Example.

This fact suggests that cemented carbide according to Example is higher in reactivity resistance than cemented carbide according to Comparative Example owing to the average content of each element of Co, Ni, Fe, and Cu with respect to the total amount of Co, Ni, Fe, and Cu in the binder phase being not lower than 10 at % and not higher than 30 at %. It also suggests that cemented carbide according to Example is higher in reactivity resistance than cemented carbide according to sample No. 102 containing 4 mass % of TaC owing to absence of the second hard phase (TaC) in the formulation or the content of TaC being not higher than 2 mass % of the total amount of cemented carbide.

<Wear Resistance Test>

The cutting tool for a cutting test was made by forming a hard film on a surface of each sample by using ion plating representing one of known PVD methods. A TiAlN film having a thickness of 4.8 μm was adopted as the hard film. A cutting tool containing cemented carbide of sample No. 1 as the substrate is denoted as the "cutting tool of sample No. 1" below. This is also applicable to samples other than sample No. 1.

A cutting time period (second) until a flank wear amount Vb attained to 0.3 mm was measured under cutting conditions below, using cutting tools of samples Nos. 1 to 15 and samples Nos. 101 to 107 made as described above. Table 1 shows results in the field of "Cutting Time Period." As the cutting time period is longer, the cutting tool can be evaluated as being excellent in wear resistance. Cemented carbide known as a difficult-to-machine material was adopted as a work material in this test, and it is expected that a cutting edge of the cutting tool becomes high in temperature in cutting. Therefore, as the cutting time period is longer, the cutting tool can be evaluated as being excellent in heat resistance.

[Condition in Wear Resistance Test]
Work material: Inconel® 718
Cutting speed: 50 m/min.
Feed rate: 0.15 mm/rev.
Depth of cut: 1.5 mm
Cutting fluid: used When the cutting tool (Example) of samples Nos. 1 to 15 was compared with the cutting tool (Comparative Example) of samples Nos. 101 to 107, in general, Example tended to be higher in wear resistance and heat resistance than Comparative Example. This fact suggests that cemented carbide according to Example was higher in wear resistance and heat resistance than cemented carbide according to Comparative Example owing to the average content of each element of Co, Ni, Fe, and Cu with respect to the total amount of Co, Ni, Fe, and Cu in the binder phase being not lower than 10 at % and not higher than 30 at %. It also suggests that cemented carbide according to Example was higher in wear resistance and heat resistance than cemented carbide according to sample No. 102 containing 4 mass % of TaC owing to absence of the second hard phase (TaC) in the formulation or the content of TaC being equal to or lower than 2 mass % of the total amount of cemented carbide.

Though the embodiment and Example of the present invention have been described as above, combination of features in each embodiment and each Example described above as appropriate is also originally intended.

It should be understood that the embodiments and Example disclosed herein are illustrative and non-restrictive in every respect. The scope of the present invention is defined by the terms of the claims rather than the embodiments and Example above and is intended to include any modifications within the scope and meaning equivalent to the terms of the claims.

REFERENCE SIGNS LIST

1 cemented carbide; 2 surface of contact between cemented carbide and work material; 3 diffusion phase; 4 point farthest from work material in interface between diffusion phase and normal cemented carbide structure; 5 work material; 6 interface with normal cemented carbide structure; T thickness of diffusion phase

The invention claimed is:

1. Cemented carbide comprising:
a first hard phase; and
a binder phase, wherein
the first hard phase is composed of tungsten carbide particles,
the binder phase is composed of cobalt, nickel, iron, and copper as constituent elements,
an average content of each of the constituent elements with respect to a total amount of cobalt, nickel, iron, and copper in the entire binder phase is not lower than 10 atomic % and not higher than 30 atomic %,
the cemented carbide contains no second hard phase, or a content of the second hard phase in the cemented carbide is equal to or lower than 2 mass % of a total amount of the cemented carbide, and
the second hard phase is composed of a compound containing at least one type of a metal element selected from the group consisting of a group-IV element in a periodic table, a group-V element in the periodic table, and a group-VI element in the periodic table except for tungsten and at least one type of an element selected from the group consisting of carbon, nitrogen, and oxygen.

2. The cemented carbide according to claim 1, wherein in an arbitrary cross-section of the cemented carbide,
a total area of an uneven region in the binder phase is not higher than 6% of an entire area of the binder phase, the uneven region being a region where a content of at least one of the constituent elements is not higher than 85% and not lower than 115% of the average content of the at least one of the constituent elements of the uneven region.

3. A cutting tool comprising the cemented carbide according to claim 1 as a substrate.

4. The cutting tool according to claim 3, further comprising a coating provided on the substrate.

5. The cemented carbide according to claim 1, wherein a content of Co and Ni in the binder phase is not lower than 25 atomic % and not higher than 30 atomic % and a content of Fe and Cu in the binder phase is not lower than 20 atomic % and not higher than 25 atomic %.

* * * * *